US012398582B2

(12) United States Patent
Dirnberger et al.

(10) Patent No.: US 12,398,582 B2
(45) Date of Patent: Aug. 26, 2025

(54) DOMESTIC ELECTRICAL APPLIANCE AND DOOR LATCH THEREFOR

(71) Applicant: emz-Hanauer GmbH & Co. KGaA, Nabburg (DE)

(72) Inventors: Albert Dirnberger, Neunburg vom Wald (DE); Benjamin Schemela, Schwarzenbach (DE); Georg Spießl, Altendorf (DE); Matthias Bauer, Schmidgaden (DE)

(73) Assignee: EMZ-HANAUER GMBH & CO. KGAA, Nabburg (DE)

( * ) Notice: Subject to any disclaimer, the term of this patent is extended or adjusted under 35 U.S.C. 154(b) by 197 days.

(21) Appl. No.: 17/968,947

(22) Filed: Oct. 19, 2022

(65) Prior Publication Data

US 2023/0119079 A1 Apr. 20, 2023

(30) Foreign Application Priority Data

Oct. 19, 2021 (DE) ......................... 102021127093.6

(51) Int. Cl.

| | |
|---|---|
| ***D06F 39/14*** | (2006.01) |
| ***D06F 37/42*** | (2006.01) |
| ***E05B 47/00*** | (2006.01) |
| ***E05B 47/06*** | (2006.01) |

(52) U.S. Cl.

CPC .......... *E05B 47/0012* (2013.01); *D06F 37/42* (2013.01); *D06F 39/14* (2013.01); *E05B 47/0603* (2013.01); *E05B 2047/0016* (2013.01); *E05B 2047/0017* (2013.01); *E05B 2047/002* (2013.01)

(58) Field of Classification Search

CPC ..... A47L 15/4259; D06F 37/28; D06F 39/14; D06F 34/20; E05B 47/06; E05B 47/0603; E05B 47/0673; E05C 9/12

USPC ................................ 292/201, 272, 280, 199

See application file for complete search history.

(56) References Cited

U.S. PATENT DOCUMENTS

2019/0040654 A1* 2/2019 Dirnberger .............. D06F 39/14

FOREIGN PATENT DOCUMENTS

| | | | | |
|---|---|---|---|---|
| CN | 112806937 A * | 5/2021 | ......... | A47L 15/4259 |
| DE | 102016014481 B3 | 3/2018 | | |
| DE | 102019126284 A1 | 4/2021 | | |

(Continued)

*Primary Examiner* — Christine M Mills
*Assistant Examiner* — Peter H Watson
(74) *Attorney, Agent, or Firm* — Hayes Soloway PC

(57) ABSTRACT

A door latch for an electrical appliance includes a rotary gripper movably disposed between a gripping position and a release position with rotational displaceability and having a gripping mouth delimited between a pair of jaws. The rotary gripper is adapted to hold captive a striker in the gripping mouth for holding closed a door of the electrical appliance in the gripping position and to permit release of the striker for opening the door in the release position. The gripping position and the release position correspond to different rotational positions of the rotary gripper. A spring arrangement in the gripping position of the rotary gripper exerts on the rotary gripper a bias which counteracts a movement of the rotary gripper towards the release position. An opener mechanism for opening the closed door includes a movably arranged opening element separate from the striker and a drive unit for driving the opening element.

7 Claims, 16 Drawing Sheets

(56) References Cited

FOREIGN PATENT DOCUMENTS

| | | | | | |
|---|---|---|---|---|---|
| KR | 100888655 | B1 * | 3/2009 | ............. | D06F 37/10 |
| WO | 2022030720 | A1 | 2/2022 | | |

* cited by examiner

DOMESTIC ELECTRICAL APPLIANCE AND DOOR LATCH THEREFOR

CROSS-REFERENCE TO RELATED APPLICATIONS

This application claims priority to German Patent Application 10 2021 127 093.6, filed on Oct. 19, 2021, the contents of which are incorporated by reference herein.

TECHNICAL FIELD

The present disclosure relates to improvements in a door latch for a domestic electrical appliance. The disclosure further relates to a domestic electrical appliance equipped with such a door latch.

BACKGROUND

In domestic washing machines, it is increasingly contemplated to implement an automatic door opening function that allows the door to open automatically, i.e. without user intervention, after the water has been completely pumped out of the washing drum of the washing machine at the end of a washing or spinning phase. This allows moisture to escape from the washing compartment and prevents the still damp laundry from smelling musty if the machine is left standing for a longer period of time.

To keep the door of the washing machine closed, a door latch is known for example from DE 10 2016 014 481 B3, which contains a rotary body (rotary gripper) that catches, on closing the door, an approaching bracket-shaped closing body in a gripping mouth of the rotary body. The gripping mouth is delimited by a pair of jaws, one of which is bumped against by the closing body as the door is closed. This causes the rotating body to rotate, which in turn causes the other jaw to move behind the closing body. The closing body is then caught in the gripping mouth and the door is held closed by the door latch. As far as the rotary body is not locked against rotation, the user can open the door latch again by pulling on the door. The pulling force exerted by the user causes the closing body to press against the other of the jaws, causing the rotating body to rotate back. The closing body can then leave the gripping mouth again, and the door can be opened again.

Particularly in the case of washing machines, there is a regular requirement not only to keep the door closed during the washing operation (including a spin cycle), but also to lock it for safety reasons, so that a user cannot open the door during such operating phases. Conversely, it is desirable that a user can open and close the door with little effort during such periods when the washing machine is out of operation, for example to load or unload the washing machine.

SUMMARY

It is an object of at least certain embodiments of the invention to provide a door latch having a rotary gripper of the type described above wherein the door latch permits the implementation of an automatic door-opening function.

It is another object of at least certain embodiments of the invention to provide a door latch that integrates both an automatic door opening function and a locking function in the latch.

Furthermore, it is an object of at least certain embodiments of the invention to provide a door latch which offers the prerequisites for being able to open and close the door with comparatively little effort in an inoperative state of a domestic appliance equipped with the door latch.

The invention provides, according to certain embodiments, a door latch for a domestic electrical appliance, comprising a rotary gripper arranged for movement between a gripping position and a release position with at least rotational displaceability and having a gripping mouth delimited between a pair of jaws. In the gripping position, the rotary gripper is capable of holding a closing body captive in the gripping mouth for keeping a door of the domestic appliance closed and, in the release position, permits release of the closing body for opening the door. The gripping position and the release position correspond to different rotational positions of the rotary gripper. The door latch further comprises a spring arrangement which, in the gripping position of the rotary gripper, applies a bias on the rotary gripper which resists movement of the rotary gripper towards the release position. In addition, the door latch includes an opener mechanism for opening the closed door. The opening mechanism comprises a movably arranged opening element, which is separate from the closing body, and a drive unit, in particular an electromotive drive unit, for driving the opening element. By driving the opening element, the opening element can be made to press against the rotary gripper by in a force-inducing, in particular torque-inducing, manner in order to urge the rotary gripper out of the gripping position towards the release position against the action of the spring arrangement.

In this solution, the force of the opening element, when it is driven through activation of the drive unit, is applied directly to the rotary gripper. A force is then exerted on the rotary gripper by the opening element, which counteracts a spring biasing force that biases the rotary gripper in the gripping position against leaving the gripping position. The application of force from the opening element to the rotary gripper causes the rotary gripper to move out of the gripping position. In certain embodiments, this movement is a rotational movement without, or at least without a substantial accompanying translational movement. Accordingly, in such embodiments, the opening element acts exclusively or at least predominantly in a torque-inducing manner on the rotary gripper.

In embodiments with a torque-inducing effect of the opening element on the rotary gripper, the spring arrangement can be designed in such a way that it acts in a bistable manner. This means that the spring arrangement exerts a bias on the rotary gripper in the gripping position, which counteracts a rotary movement of the rotary gripper towards the release position and exerts a bias on the rotary gripper in the release position, which counteracts a rotary movement of the rotary gripper towards the gripping position. Both in the rotational position that corresponds to the gripping position of the rotary gripper and in the rotational position that corresponds to the release position of the rotary gripper, the spring device thus has a biasing effect on the rotary gripper in the sense of a stable retention of the rotary gripper in the respective rotational position. The spring device thus has two stable states of rotational bias—hence bistable. To move the rotary gripper from the gripping position to the release position or vice versa, a snap point must be overcome at which the direction of the rotational biasing effect of the spring arrangement changes. To realize such a biasing behavior, the spring arrangement can, for example, comprise a leg spring (torsion spring), which is supported with one of its spring legs on the rotary gripper and with its other spring leg on a component of the door latch relative to which the rotary gripper executes its rotational movement between the gripping position and the release position.

In certain embodiments having a spring arrangement acting in a bistable manner in the above sense, the opening element can be driven by means of the drive unit by a distance, in particular a linear distance, which is sufficient to urge the rotary gripper out of the gripping position at least as far as an intermediate rotational position at which the direction of the rotational biasing effect of the spring arrangement snaps over. The intermediate rotational position is a rotational position of the rotary gripper that lies between the two rotational positions corresponding to the gripping position and the release position. After the direction of the rotational biasing effect of the spring arrangement has flipped over, the spring arrangement can push the rotary gripper further towards its release position; the door of the domestic appliance can then open under the action of the spring arrangement, which relaxes in the process, possibly assisted by a relaxation effect of a door seal. The user does not need to be involved in this process.

It should be noted that the present disclosure is not intended to exclude embodiments in which the motion of the rotary gripper from the gripping position effected by the opening element is a translational motion, or at least includes a substantial translational motion component.

The direct physical interaction between the opening element and the rotary gripper allows the opening element and the rotary gripper to be integrated into a latch assembly which can be installed as a single unit in a space-saving manner either on the door or on a main body of the domestic appliance movably, in particular pivotably, supporting the door. The door latch can be realized with an integrated function for automatic door opening.

In certain embodiments, the rotary gripper is provided with an extension projecting eccentrically from an axis of rotation of the rotary gripper, in particular offset axially relative to the gripping mouth, for cooperation with the opening element. Via the extension, the opening element can introduce a torque into the rotary gripper, which causes the rotary gripper to rotate for the purpose of automatic door opening. With sufficiently large eccentricity of the extension, i.e. correspondingly large radial distance between the extension and the rotary axis of the rotary gripper, comparatively small forces of the opening element may be sufficient to overcome the biasing effect of the spring arrangement holding the rotary gripper in the gripping position and to induce a rotary movement of the rotary gripper.

According to certain embodiments, the rotary gripper comprises a contact portion fixed relative to the jaws of the rotary gripper and arranged at a radial distance from an axis of rotation of the rotary gripper for contacting by the opening element. The opening element is arranged on a linearly movable opening slider for joint linear sliding movement therewith. For example, the contact portion is formed on an actuation extension of the rotary gripper which is integrally connected to the jaws of the rotary gripper.

According to certain embodiments, the opening element is arranged on a movable, in particular linearly movable, opening slider for joint sliding movement therewith. In these embodiments, the opening slider has a first slider section that is or can be brought into force introduction coupling with the drive unit, wherein the opening element is arranged in a second slider section that is spaced apart from the first slider section in the sliding direction of the opening slider and is designed for unidirectional entrainment coupling with the rotary gripper. The first slider section has, for example, a toothed section with which a pinion driven by a drive motor of the drive unit is in meshing engagement. Alternatively, the opening slider may have its first slider section in spring-biased abutting contact with a circumferential surface of a control disk, which is driven to rotate by a drive motor of the drive unit, in the manner of a cam-cam follower engagement. The unidirectional entrainment coupling is an abutment coupling, which causes entrainment of the rotary gripper or introduction of force into the rotary gripper only in one direction of movement of the opening slider, but does not permit any torque-inducing action on the rotary gripper in the opposite direction of movement of the opening slider, at least within the regular movement stroke of the opening slider provided for the proper operation of the door latch.

In the force transmission path between the drive unit and the rotary gripper, a spring elastic force transmission body may be arranged, e.g., for damping purposes, in the form of a leaf spring or a leg spring, for example.

According to another aspect, the invention provides, at least according to certain embodiments, a door latch for a domestic electrical appliance. The door latch comprises a latching element movably arranged between a closing position and a release position, which in the closing position is capable of holding a closing body captive for keeping a door of the domestic appliance closed and in the release position allows a release of the closing body for opening the door. Further, the door latch comprises a plurality of movably arranged functional elements for respective different mechanical functions with respect to the latching element. A first of the functional elements forms a locking element movably arranged between a locking position and an unlocking position, which in the locking position is configured to block the latching element against movement from the closing position to the release position and in the unlocking position permits movement of the latching element from the closing position to the release position. In addition, the door latch comprises a drive unit, in particular an electromotive drive unit, for driving the functional elements from a common driving force source.

Due to the supply of the functional elements, i.e. the locking element (first functional element) and at least one other functional element, with force from a common source of force, a cost-effective and space-saving design of the door latch is possible, because different driving force sources are not required for the locking function on the one hand and another mechanical function of the door latch with regard to the latching element, e.g. an automatic door opening function, on the other hand.

In certain embodiments, the first functional element and at least one other of the functional elements are formed by separate components that are arranged so as to be movable independently of one another. Alternatively or additionally, the first functional element and at least one other of the functional elements may be formed by a common component.

According to certain embodiments, the drive unit comprises a control body drivable for rotation by the driving force source and having at least one radially contoured control track formed on a radial circumferential surface of the control body for controlling the position of at least two functional elements of the plurality of functional elements. Each of the at least two functional elements is motion-coupled to a track follower that is in abutting contact with the circumferential surface of the control body. The contact may be spring biased. According to certain embodiments, the control body may have on its circumferential surface two control tracks axially offset with respect to an axis of rotation of the control body, each for a path follower motion-coupled to a respective different one of the at least two functional elements.

According to certain embodiments, another one of the functional elements forms an opening element which is configured to exert, in the closing position of the latching element, a force on the latching element urging the latching element from the closing position towards the release position. With such an opening element the mentioned automatic door opening function can be realized.

The drive coupling between the drive unit and the locking element, on the one hand, and the opening element, on the other hand, is designed in certain embodiments in such a way that, by actuating the drive unit, the combination of the locking element and the opening element can be adjusted into three combinatorial states: a first state in which the door latch is unlocked and the door opening function is deactivated, a second state in which the door latch is locked and the door opening function is still deactivated, and a third state in which the door latch is unlocked again but the door opening function is activated.

According to certain embodiments, the locking element and the opening element may be formed by a common, movably arranged functional body. In such embodiments, the common functional body may be adjustable by means of the drive unit into three defined positions, of which: a first position corresponds to an unlocking state of the locking element and a deactivation state of the opening element; a second position corresponds to a locking state of the locking element and the deactivation state of the opening element; and a third position corresponds to the unlocking state of the locking element and an activation state of the opening element. In this regard, the common functional body may be arranged to move from the first position in a first direction of movement to the second position and in an opposite second direction of movement to the third position.

In other embodiments, on the other hand, the locking element and the opening element are formed by separate functional bodies that are each arranged so as to be movable independently of one another.

According to certain embodiments, another of the functional elements forms an adjustment element, the position of which determines the strength of a bias exerted on the latching element by a spring element supported between the latching element and the adjustment element, wherein the bias, in the closing position of the latching element, counteracts a movement of the latching element in the direction of the release position.

The first functional element or/and at least one other of the functional elements are arranged to be linearly movable, at least in certain embodiments.

According to certain embodiments, the drive unit comprises at least one rotationally driven, for example disk-like, control body for controlling the position of the locking element and/or at least one other of the functional elements. The control body forms a control track with which a track follower motion-coupled to the locking element and/or the at least one other functional element is in engagement, in particular in spring-biased engagement. The position control of the locking element and/or the opening element can thus be accomplished by realizing a cam-cam follower pairing, the function of the cam of this pairing being performed by a control body driven in rotation by means of the drive unit. By suitable contouring of the control track, various movement patterns of the locking element and/or of the at least one other functional element, in particular also relative to each other, can be realized.

Depending on whether the locking element and the at least one other functional element are motion-coupled to each other or are arranged to move independently of each other, the control body may form a single control track via which the locking element and the at least one other functional element are jointly position-controlled, or it may form two control tracks, one of which serves to control the position of the locking element and the other of which serves to control the position of the at least one other functional element. In the latter case, the control body accordingly forms a control track in relation to each path follower, wherein a first one of the path followers is motion-coupled to the locking element and a second one of the path followers is motion-coupled to the at least one other functional element.

The control track is an orbital track, at least in certain embodiments. By this is meant that the control track is a track closed in itself into an endless loop. Such a 360-degree orbit enables oscillating linear back and forth movements of the locking element and/or of the at least one other functional element without directional reversal of an electric drive motor of the drive unit.

The latching element may, for example, be configured as a rotary gripper with a gripping mouth, as explained above. In particular, in certain embodiments, the latching element is formed by a rotary gripper rotatably arranged relative to a latch housing of the door latch between the closing position and the release position and having a gripping mouth delimited between a pair of jaws, the rotary gripper being adapted to capture the closing body in the gripping mouth in the closing position and to allow the closing body to escape from the gripping mouth in the release position. The door latch further comprises a spring device which, in the closing position of the rotary gripper, exerts a bias on the rotary gripper to resist movement of the rotary gripper towards the release position. In addition, the latch housing accommodates the rotary gripper, the plurality of functional elements, the drive unit, and the spring device.

According to yet another aspect, the invention provides a door latch for a domestic electrical appliance, the door latch comprising a latching element movably disposed between a closing position and a release position, the latching element being capable of capturing a closing body for holding a door of the domestic appliance closed in the closing position and allowing release of the closing body for opening the door in the release position. The door latch further comprises a spring arrangement which, in the closing position of the latching element, exerts a bias on the latching element which opposes movement of the latching element towards the release position. In the closing position of the latching element, i.e., when and while the latching element is in the closing position, the strength of the bias is variable.

The variability of the bias of the spring arrangement makes it possible to set a different spring hardness of the spring arrangement in different operating phases and/or different phases of use of the domestic appliance and thus to influence the closing retention force of the door latch, i.e., the force with which the door latch keeps the door closed. In an inoperative state of the domestic appliance, a comparatively low closing retention force of the door latch may be desirable, since a user can then open and close the door with little effort. However, this comparatively low closing retention force may not be sufficient for all conceivable operating and usage situations of the domestic appliance. In the case of a washing machine, for example, the door should be tightly closed during washing to prevent water from escaping. For this purpose, a door seal must be kept sufficiently compressed by the closed door, which may not be ensured if the closing retention force of the door latch is too low. Certain embodiments therefore provide for the strength of the bias of the spring arrangement to be capable of being increased after the door has been closed. In this way, for example, during washing operation of a washing machine, it can be ensured that the door latch provides a sufficiently high closing retention force to reliably seal the washing chamber with the washing water contained therein. During washing operation, the user should not normally be given the opportunity to open the door anyway. Therefore, an increased closing retention force of the door latch during washing operation does not conflict with the user-friendliness of the door latch, which manifests itself, for example, in the fact that the closing retention force of the door latch is relatively reduced when the domestic appliance is not in operation.

Furthermore, it is not excluded within the scope of the present disclosure for the strength of the bias of the spring arrangement to also be variable in the release position, i.e., when and while the latching element is in the release position.

The latching element may, for example, be configured as a rotary gripper having a gripping mouth, as discussed above.

According to certain embodiments, the door latch comprises an electrically controllable adjustment mechanism for varying the spring-effective geometry of a spring element of the spring arrangement in the closing position of the latching element. In certain embodiments, the spring arrangement comprises a leg spring, wherein the adjustment mechanism is capable of causing a relative positional change of the spring legs of the leg spring in the closing position of the latching element. By relatively moving the two spring legs of the leg spring towards or away from each other, their geometry and thus the spring stiffness can be influenced.

Irrespective of the possible design of the spring arrangement with a leg spring, the adjustment mechanism comprises in certain embodiments a movably arranged, in particular linearly movable adjustment element. The spring arrangement comprises a spring element which is supported between the adjustment element and the latching element, whereby a biasing force exerted by the spring element on the latching element can be varied by changing the position of the adjustment element in the closing position of the latching element.

The aspect of the variability of the bias of the spring arrangement can be implemented not only, but especially if the door latch is designed with a locking function and comprises a locking element movably arranged between a locking position and an unlocking position, which in the locking position is configured to block the latching element against movement from the closing position into the release position and in the unlocking position permits a movement of the latching element from the closing position into the release position. In domestic washing machines, the closed door is usually locked before water is introduced into the washing drum. In washing machines, therefore, there is typically only a need for a comparatively high closing retention force of the door latch during phases in which the closed door is also locked. Thus, at least according to certain embodiments, an action on the spring arrangement in the sense of increasing the bias of the spring arrangement can be made dependent on the locking element being in its locking position.

The present disclosure further provides a domestic electrical appliance equipped with a door latch. The domestic appliance comprises an appliance main body (appliance cabinet) with a process chamber accessible through an access opening, in which a working process of the domestic appliance can be carried out, e.g., a washing process for items of clothing or a dishwashing process for dishes or a thermal cooking process for food. A door is movably, in particular pivotably, mounted on the appliance main body, by the closing of which the access opening to the process chamber can be closed. The domestic appliance can accordingly be, for example, a washing machine, a so-called washer-dryer (a washing machine with an additional dryer function), a dishwasher or an oven. In the case of a washing machine, the latter may, for example, be of the so-called front-loading type, in which the door on a front side of the washing machine is arranged so as to be pivotable about a vertical pivot axis and is typically designed with a transparent porthole window.

The door latch of the domestic appliance comprises: a latching element movably arranged between a closing position and a release position, which in the closing position is capable of holding a closing body captive for keeping the door closed and in the release position permits release of the closing body for opening the door; a spring element which in the closing position of the latching element exerts a biasing force on the latter which opposes a movement of the latching element towards the release position; a movably arranged adjustment element coupled to the spring element; and an actuator for driving the adjustment element. By changing the position of the adjustment element, the biasing force exerted by the spring element on the latching element can be varied in the closing position of the latching element.

Furthermore, the domestic appliance comprises a control unit for controlling the actuator. The control unit is adapted to control the actuator in the sense of increasing the biasing force of the spring element depending on the fact that the door is closed and at least one additional condition indicating an imminent or already performed start of operation of the domestic appliance is fulfilled. The additional condition may, for example, pertain to the actuation of a program start button and/or the start of a program run and/or the reaching of a certain operating phase during a program run and/or the locking of the door.

BRIEF DESCRIPTION OF THE DRAWINGS

The invention will be explained further in the following with reference to the accompanying drawings, which illustrate.

DETAILED DESCRIPTION

Figure 1:
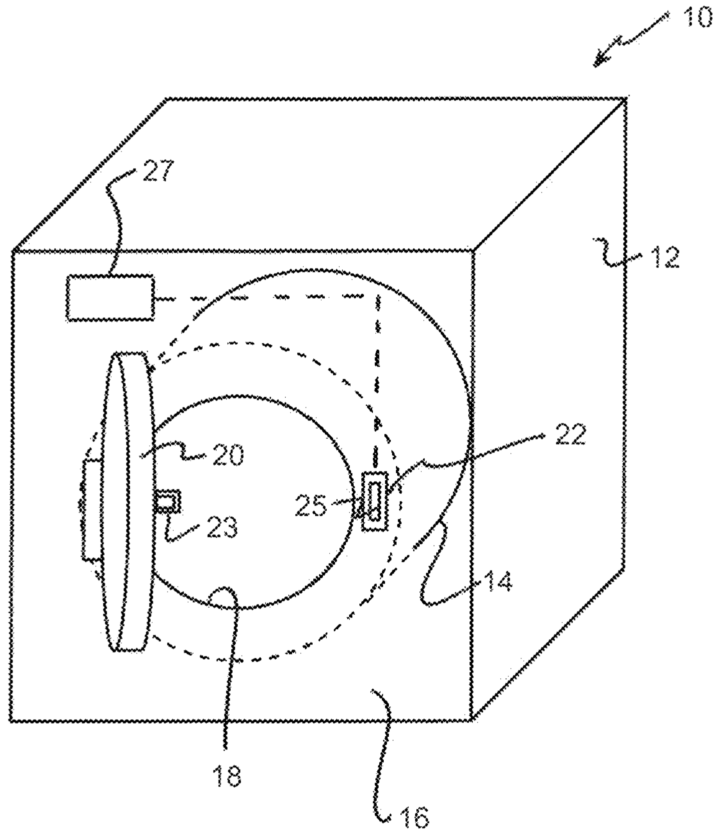
FIG. 1 schematically shows a domestic washing machine according to an embodiment.

Reference is initially made to FIG. 1. There, as an exemplary embodiment of a domestic electrical appliance in which a door latch according to the invention can be used, a washing machine 10 of the front-loader type is shown schematically. The washing machine 10 has a cabinet (appliance main body) 12 with a washing drum 14 rotatably mounted therein. Through an access opening 18 formed in a front wall 16 of the cabinet 12, the interior (working space) of the washing drum 14 is accessible for loading and unloading laundry items. By means of a door 20 pivotally mounted on the body 12, the access opening 18 can be closed in a liquid-tight manner.

A door latch 22 serves to keep the closed door 20 closed. The door latch 22 cooperates with a closing body 23, which in the example shown is designed in the form of a striker or bracket. The closing body 23, on closing of the door 20, dips into an insertion opening 25 of the door latch 22 and is caught in the door latch 22 by a latching element not shown in greater detail in FIG. 1, but formed by a rotary gripper in the embodiments explained below. The closing body 23 is thereby secured against escape from the insertion opening 25. The door latch 22 is of the so-called push-pull type, i.e., by pressing against the door 20 the door latch 22 can be closed, and by subsequently pulling on the door 20 the door latch 22 can be opened again. In the example case shown, the door latch 22 is mounted on the body 12 of the washing machine 10, while the closing body 23 is mounted on the door. It will be understood that a reverse arrangement of the door latch 22 and the closing body 23 on the body 12 and the door 20 is equally possible. An electrical, for example microprocessor-based, control unit 27 is used to control and, if desired, supply power to one or more electrical or/and electronic components of the door latch 22, for example to control an electromotive actuator of the door latch 22.

Figure 2:
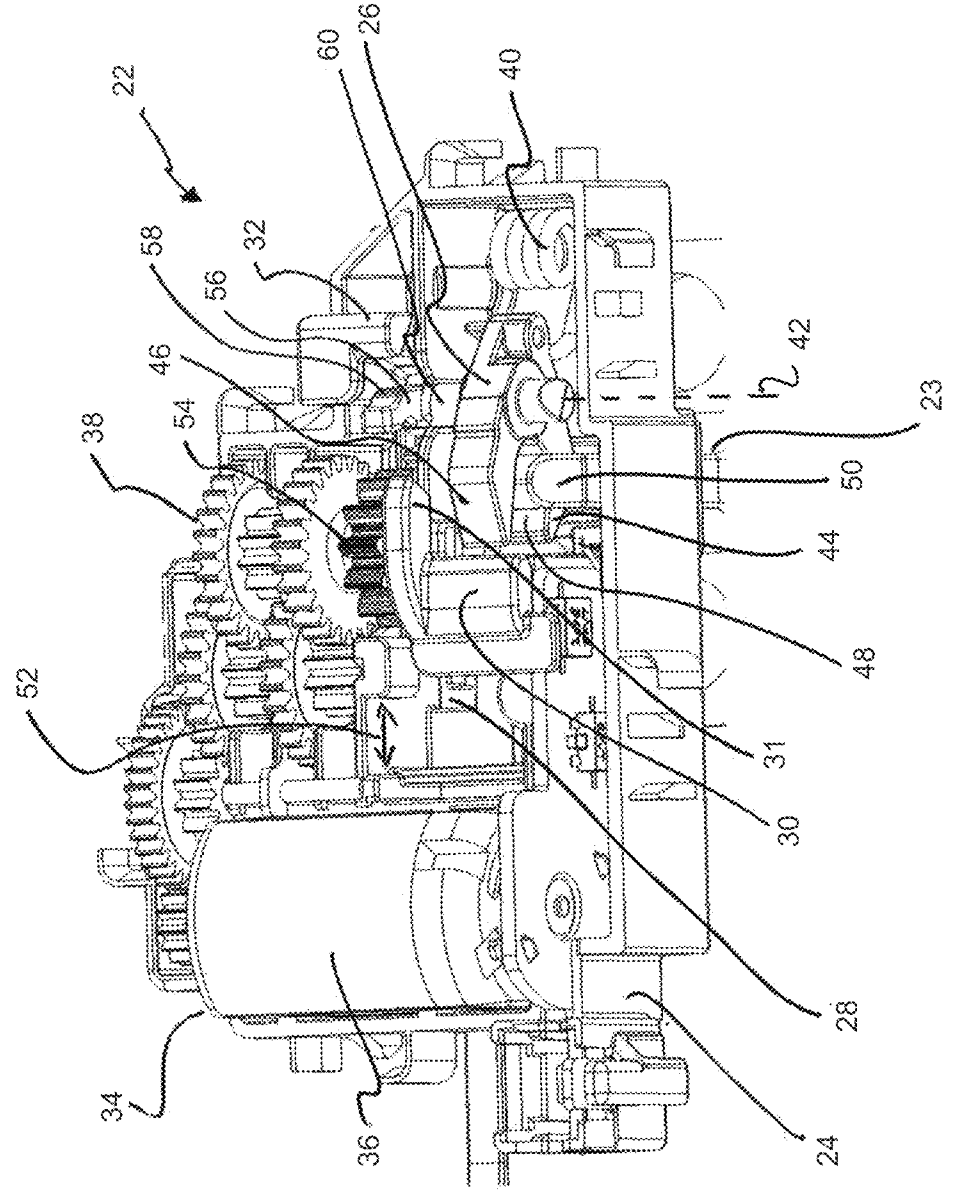
FIG. 2 in perspective a door latch according to an embodiment in a neutral state, in which a manual closing and opening of the door latch is possible.
Figure 3:
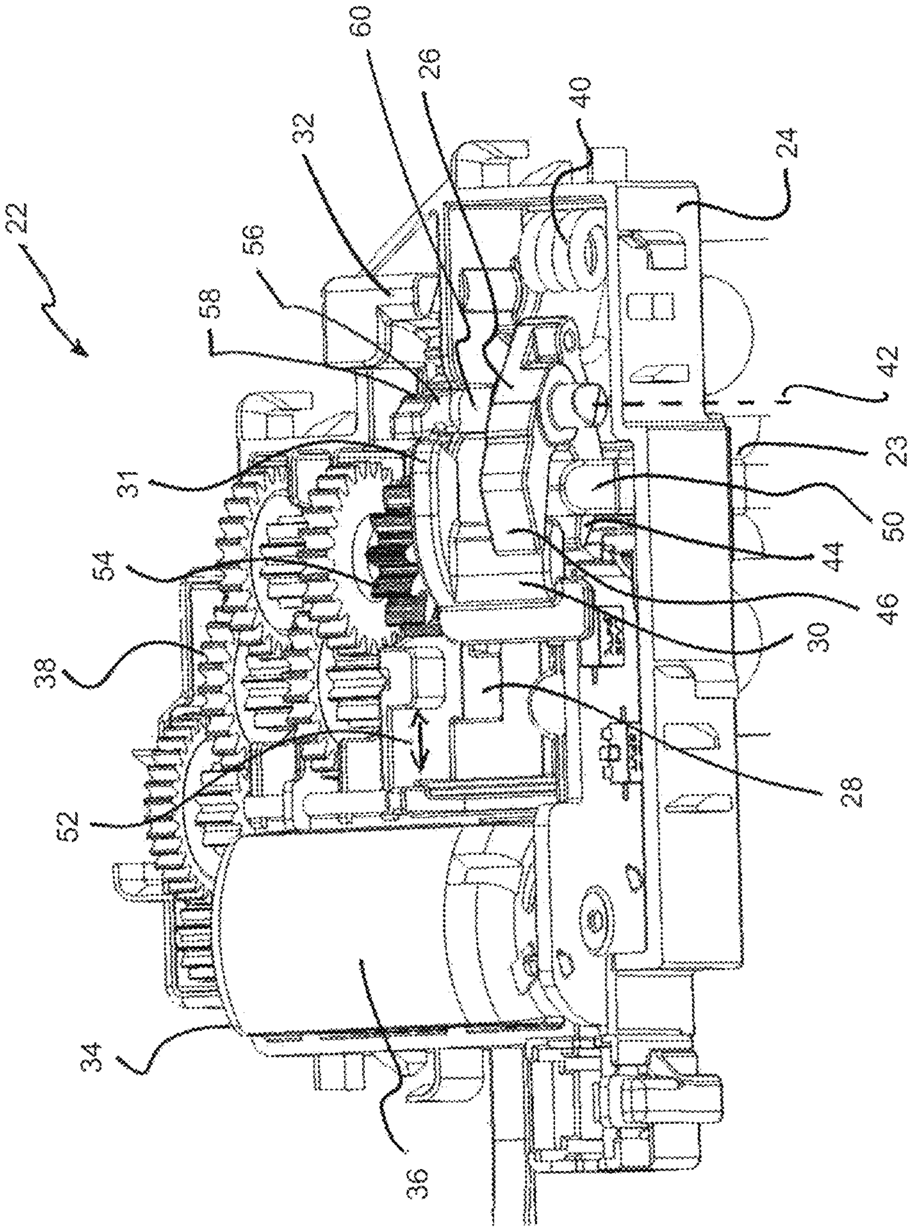
FIG. 3 in perspective the door latch of FIG. 2 in a closed and locked state.
Figure 4:
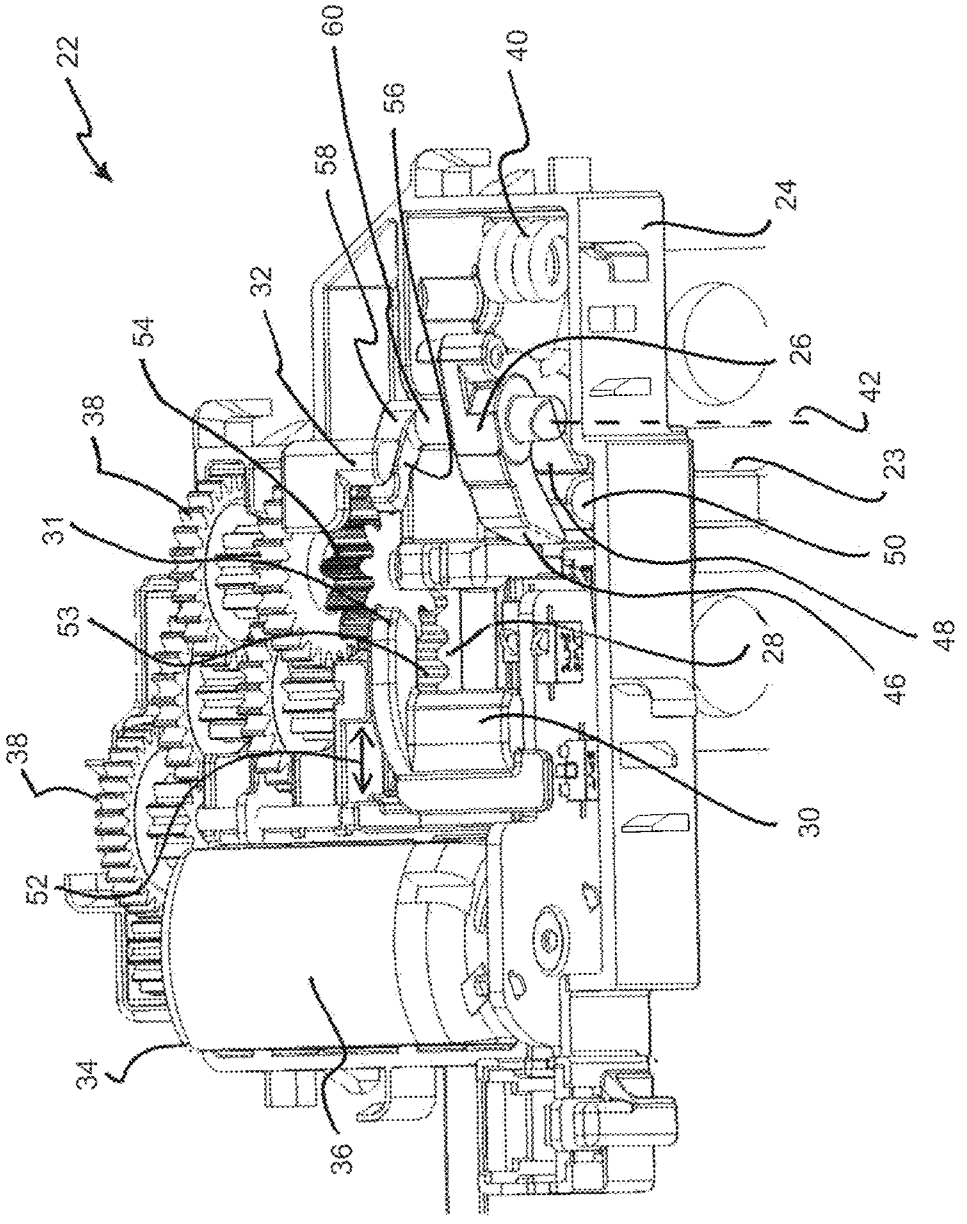
FIG. 4 in perspective the door latch of FIG. 2 in a state after automatic opening.

A first embodiment of the door latch 22 is shown in FIGS. 2 through 4. In this first embodiment, the door latch 22 comprises a latch housing 24 in which a rotary gripper 26 as an implementation of a latching element, a multi-functional slider 28 with functional elements 30, 31, 32 and a drive unit 34 with an actuator in the form of an electric drive motor 36 and a multi-wheel reduction gear 38 are accommodated. Furthermore, the latch housing 24 accommodates a torsion spring (leg spring) 40, which is supported between the rotary gripper 26 and the latch housing 24, as an embodiment of a spring element exerting a biasing effect on the rotary gripper 26, as well as various electrical or/and electromechanical components not further explained in detail herein, which form, for example, one or more electrical switches with a function for detecting the closed state of the door 20 or/and for detecting a locked state of the rotary gripper 26. The rotary gripper 26 is rotatable relative to the latch housing 24 about an axis of rotation 42 between a gripping position (closing position), which it assumes in FIGS. 2 and 3, and a release position, which it assumes in FIG. 4. For example, the rotary gripper 26 is mounted on the latch housing 24 in a translationally fixed manner relative to the latch housing 24, i.e., the rotary gripper 26 can only perform a rotational movement about the rotational axis 42 relative to the latch housing 24, but no translational movement.

The rotary gripper 26 defines a gripping mouth 48 delimited by a pair of jaws 44, 46, in which a leading striker web 50 of the closing body 23 is trapped when the door 20 is closed. On closing of the door 20, the closing body 23 dips into the insertion opening 25 of the door latch 26 with the striker web 50 in front and initially strikes against one of the jaws 44, 46 (here the jaw 46) of the rotary gripper 26. This causes the rotary gripper 26 to rotate about the axis of rotation 42, starting from the release position shown in FIG. 4. In the course of this rotation, the other jaw (here the jaw 44) of the rotary gripper 26 moves behind the striker web 50, thereby preventing it from escaping from the insertion opening 25. To open the closed door 20, the user pulls on it. This causes the striker web 50 to exert pressure on the jaw 44, thereby causing the rotary gripper 26 to rotate in the opposite direction from the gripping position shown in FIG. 2 until the rotary gripper 26 finally reaches its release position, in which the striker web 50 can escape from the gripping mouth 48.

FIG. 2 shows a neutral, or normal, state of the door latch 20, in which the door latch 22 can be closed and opened again by manual operation of the door 20. In this neutral state, the rotary gripper 26 can rotate freely between the release position and the gripping position, with only the biasing effect of the torsion spring 40 having to be overcome. This biasing effect is bistable, i.e. in an intermediate rotational position between the release position and the gripping position of the rotary gripper 26, the direction of the biasing effect of the torsion spring 40 switches over so that the rotary gripper is biased both in the release position and in the gripping position against leaving the respective rotational position.

The multi-functional slider 28 is designed as a linear slider, which is displaceable relative to the rotary gripper 26 along a linear direction of movement indicated by a double arrow 52 and orthogonal to the axis of rotation 42. The multi-functional slider 28 may be a one-piece injection molded component that includes the functional elements 30, 31, 32 as integral components. In the neutral state of the door latch 22 according to FIG. 2, the multi-functional slider 28 is in a neutral position in which its functional elements 30, 31, 32 are ineffective with respect to the rotary gripper 26.

The multi-functional slider 28 has a longitudinal toothing 53 (FIG. 4) with which an output pinion 54 of the reduction gear 38 is in meshing engagement. By activating the electric motor 36, the multi-functional slider 28 can be moved from the neutral position according to FIG. 2 in a first sliding direction into a locking position according to FIG. 3 and in an opposite second sliding direction into an opening position according to FIG. 4. In the locking position according to FIG. 3, when the door latch 22 is closed (i.e. when the rotary gripper 26 is in the gripping position and the door 20 is closed), the functional elements 30, 31 are moved into the rotary movement path of the rotary gripper 26 in such a way that a reverse rotation of the rotary gripper 26 from the gripping position into the release position is prevented. The rotary gripper 26 is thus locked in the locking position of the multi-functional slider 28 when the door latch 22 is closed; the door 20 cannot be opened. Accordingly, the functional elements 30, 31 each act as a locking element.

In the example shown, the locking element 30 extends between the jaws 44, 46 of the rotary gripper 26 into the gripping mouth 48 when the door latch 22 is closed and the multi-functional slider 28 is in the locking position; the locking element 31 is moved in front of an actuation extension 56 of the rotary gripper 26 in the locking position of the multi-functional slider 28. Each of the locking elements 30, 31 independently locks the rotary gripper 26 against rotation from the gripping position to the release position. In the neutral position of the multi-functional slider 28 as shown in FIG. 2, the locking element 30 is moved out of the rotational path of the jaws 44, 46 and the locking element 31 is moved out of the rotational path of the actuation extension 56; therefore, in the neutral position of the multi-functional slider 28, the rotary gripper 26 is free to rotate between the gripping position and the release position. It is understood that the number and location of those structures of the multi-functional slider 28 acting as locking elements is not subject to any fundamental limitation. For example, it may be sufficient to provide only one of the locking elements 30, 31 or additionally to provide at least one further locking element on the multi-functional slider 28 which can cooperate with yet another portion of the rotary gripper 26 in order to block the rotary gripper 26 against leaving the gripping position.

The functional element 32 of the multi-functional slider 28, on the other hand, acts as an opening element by means of which an opening of the door latch 22 can be forced without the user having to pull on the door 20 for this purpose. The actuation extension 56 of the rotary gripper 26 defines a contact portion 58 radially spaced from the axis of rotation 42 for contacting by the opening element 32. In the example case shown, the actuation extension 56 is essentially formed as an arm which projects in an approximately radial direction from a support pin 60 of the rotary gripper 26 centered on the axis of rotation 42. The actuation extension 56 may be formed in one piece together with the support pin 60 and the jaws 44, 46 of the rotary gripper 26; in any case, however, the actuation extension 56 forms a portion of the rotary gripper 26 which is stationary relative to the jaws 44, 46.

Due to the radial distance of the contact portion 58 from the axis of rotation 42, a torque can be introduced into the rotary gripper 26 by applying force to the contact portion 58 (with the door latch 22 closed). This torque causes the rotary gripper 26 to rotate from the gripping position towards the release position. The opening element 32 is arranged on the multi-functional slider 28 in such a way that when the multi-functional slider 28 is moved from the neutral position according to FIG. 2 to the opening position according to FIG. 4 with the door latch 22 closed, it hits against the contact portion 58 and thereby acts on the rotary gripper 26 to introduce torque. The length of travel of the multi-functional slider 28 between the position at which the opening element 32 abuts the contact portion 58 until the opening position is reached as shown in FIG. 4 is such that the opening element 32 urges the rotary gripper 26 to a rotational position beyond the snap point at which the biasing direction of the torsion spring 40 snaps around and the rotary gripper 26 is urged further into the release position by the force of the torsion spring 40 alone.

By moving it back and forth, the multi-functional slider 28 can thus be moved from the neutral position according to FIG. 2 to the locking position according to FIG. 3 and to the opening position according to FIG. 4. Thus, a single actuator (electric motor 36) is sufficient for both locking and automatically opening the door latch 22.

In the further figures, identical or similarly acting components are given the same reference signs as in the preceding figures, but supplemented by a letter. Unless otherwise stated below, reference is made to the above explanations for such identical or similarly acting components.

Figure 5:
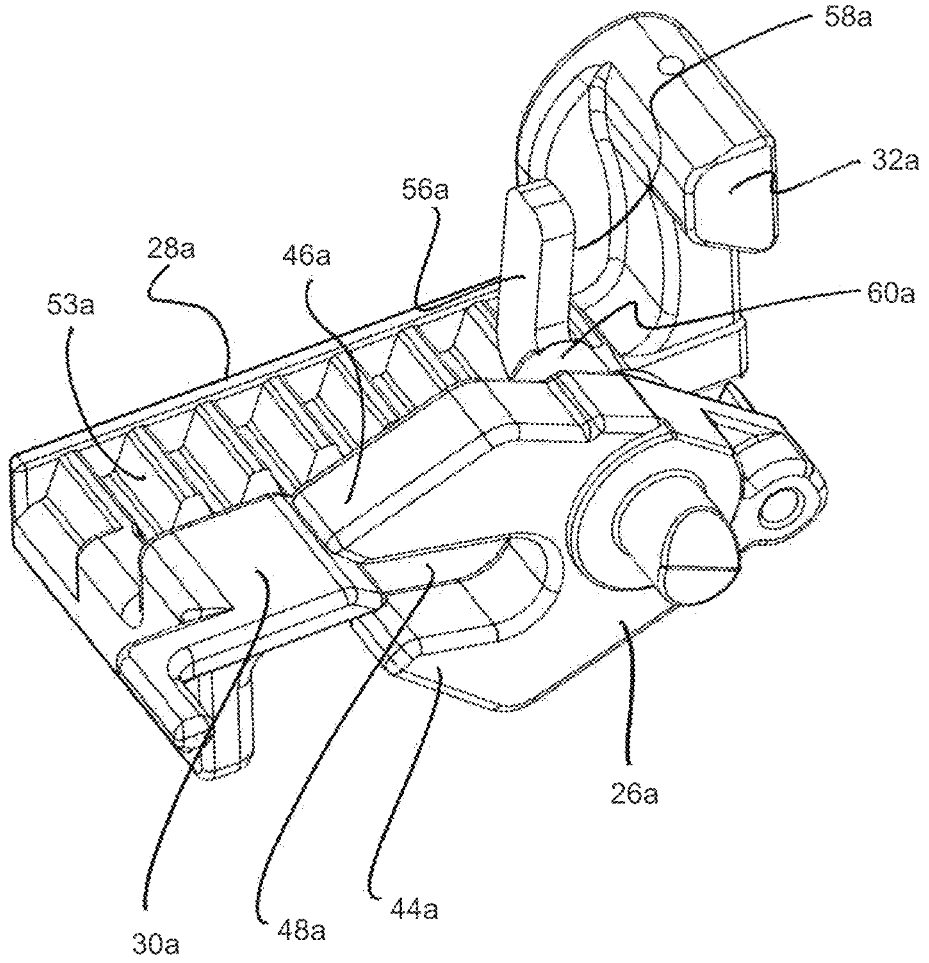
FIG. 5 in perspective a rotary gripper and a multifunctional slider of a modified variant of the door latch of FIGS. 2 to 4.

FIG. 5 shows a rotary gripper 26*a* and a multi-functional slider 28*a*, which represent a variation of the rotary gripper 26 and the multi-functional slider 28 of the embodiment according to FIGS. 2 to 4. In the variant according to FIG. 5, the multi-functional slider 28 comprises only the locking element 30*a*, and there is no further locking element for blocking interaction with the actuation extension 56*a*. In the locking position of the multi-functional slider 28*a*, the rotary gripper 26*a* is thus blocked at only one point. Otherwise, the rotary gripper 26*a* and the multi-functional slider 28*a* correspond mechanically and functionally to the rotary gripper 26 and the multi-functional slider 28 of the embodiment of FIGS. 2 to 4.

Figure 6:
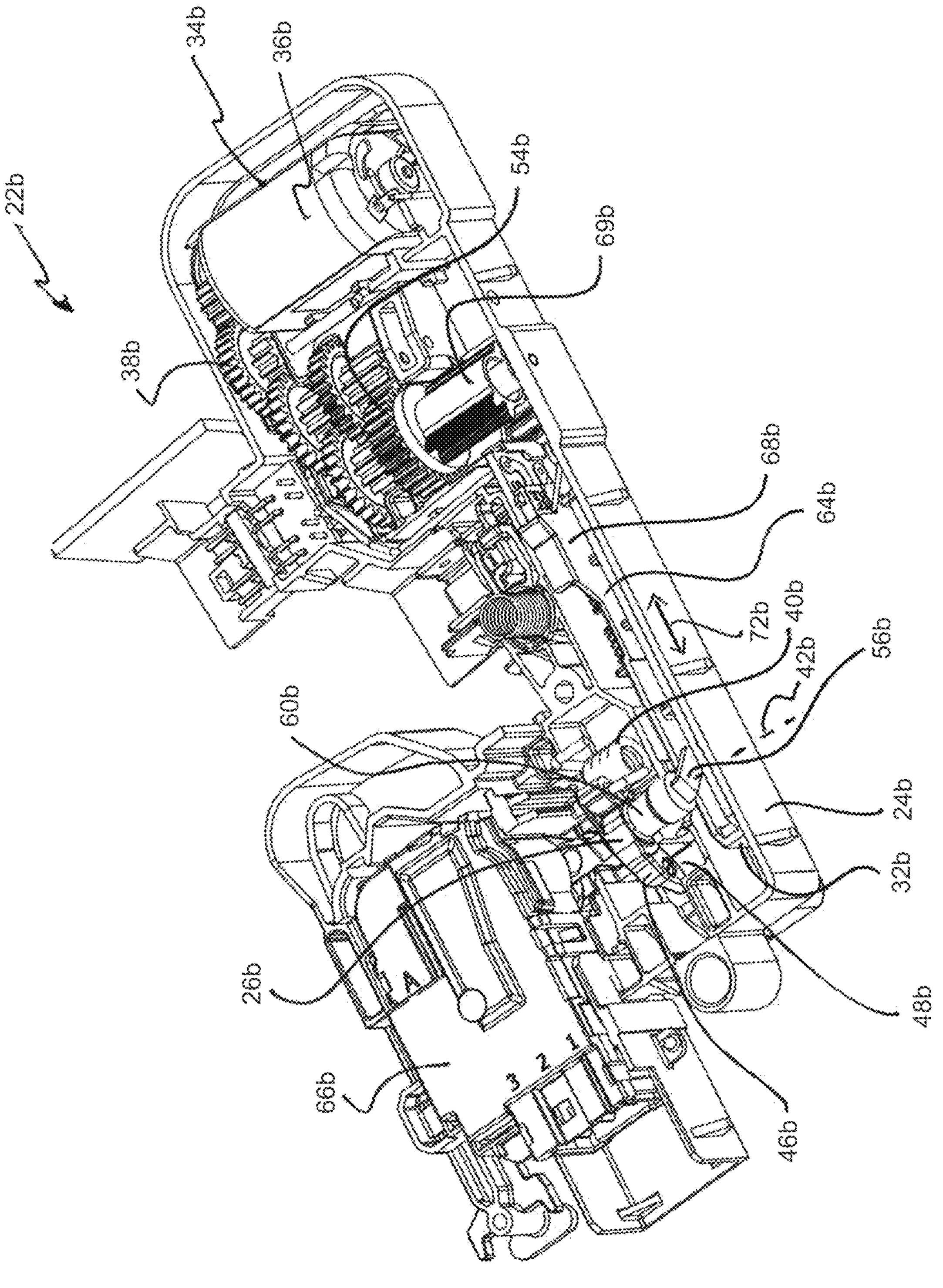
FIG. 6 a perspective view of a door latch according to a further embodiment in an open state.
Figure 7A:
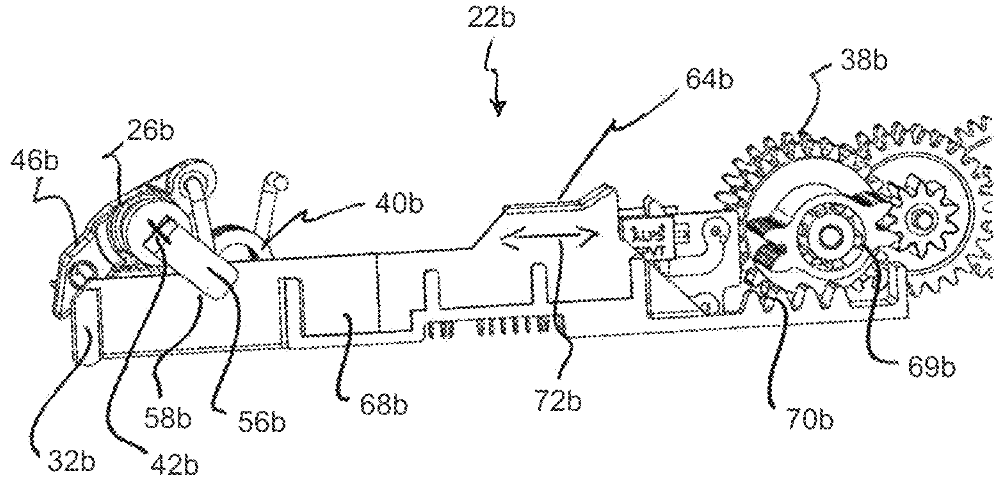
FIG. 7*a* a sectional view of the door latch of FIG. 6 in the open state.
Figure 7B:
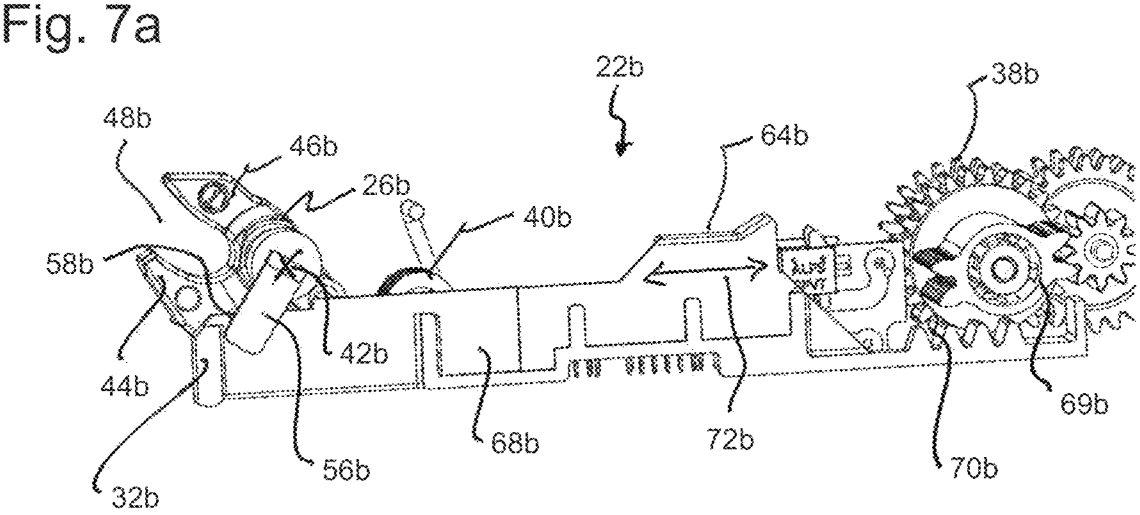
FIG. 7*b* a sectional view corresponding to FIG. 7*a*, but in a closed state of the door latch of FIG. 6.
Figure 7C:
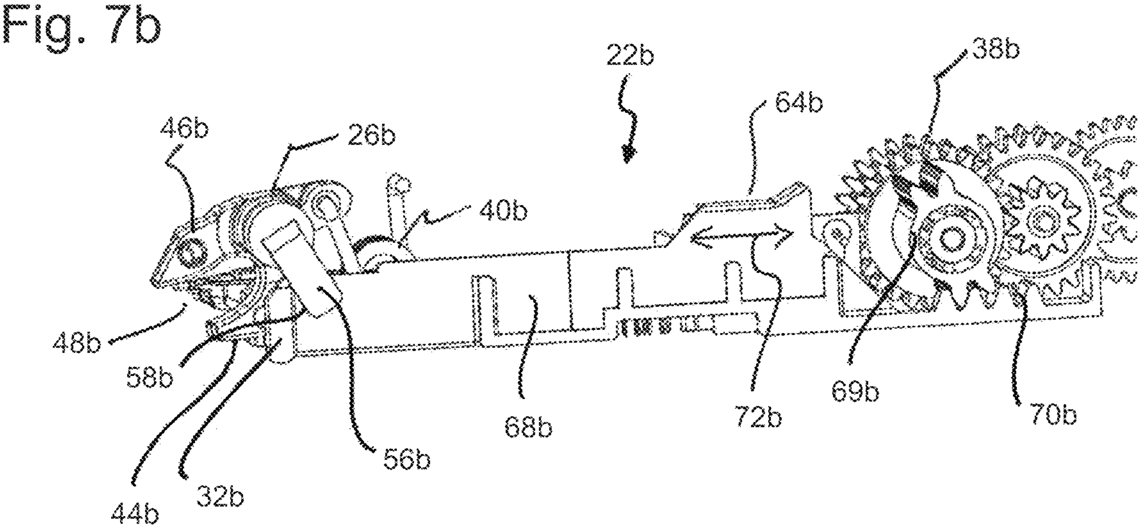
FIG. 7*c* a sectional view corresponding to FIGS. 7*a*, 7*b*, but in an automatic opening state of the door latch of FIG. 6.

Reference is now made to the embodiment of FIGS. 6 to 7*c*. In this embodiment, the door latch 22*b* includes an opener mechanism 64*b* and a latch mechanism 66*b* separate therefrom. The opener mechanism 64*b* includes the drive unit 34*b* (including the electric motor 36*b* and the reduction gear 38*b*), and an elongated opening slider 68*b* that is received in the latch housing 24*b* for sliding movement relative to the rotary gripper 26*b* in a linear direction orthogonal to the axis of rotation 42*b* of the rotary gripper 26*b*. In the region of one slider longitudinal end, the opening slider 68*b* is provided with a toothed section 70*b* with which a partially toothed coupling wheel 69*b*, which is non-rotatably coupled to the output pinion 54*b* of the reduction gear 38*b*, can mesh for the purpose of driving the opening slider 68*b*. In the region of an opposite slider longitudinal end, the opening slider 68*b* is configured with an opening element 32*b*, which may be an integral part of the opening slider 68*b* and, in the example shown, is formed by an end wall piece of the opening slider 68*b*.

The opening element 32*b* is configured for unidirectional driving coupling (actuation coupling) with the actuation extension 56*b* of the rotary gripper 26*b*. Such unidirectional driving coupling means that the opening element 32*b* can be brought into abutment with the actuation extension 56*b* in one sliding direction of the opening slider 68*b* (from left to right in FIGS. 7*a* to 7*c*), thereby introducing a torque into the rotary gripper 26*b*. However, in the opposite sliding direction of the opening slider 68*b*, no such abutment or force coupling between the opening slider 68*b* and the rotary gripper 26*b* is provided or possible (at least within a regular range of movement of the opening slider 68*b* provided for proper operation of the opener mechanism 64*b*). The opening slider 68*b* can therefore only act on the rotary gripper 26*b* in a force-inducing manner in one slide direction, but not in the other slide direction.

In FIGS. 7*a* and 7*b*, the opening slider 68*b* is in a standby position (neutral position) in which the rotary gripper 26*b* can rotate between the release position (FIG. 7*a*) and the gripping position (FIG. 7*b*) without interference from the opening slider 68*b*. In this standby state of the opening mechanism 64*b*, the door latch 22*b* can thus be closed, and opened again, by manual operation of a user. In this state, the opening element 32*b* is without function for the rotary gripper 26*b*. A biasing spring not shown in detail in the figures may bias the opening slider 68*b* to the standby position shown in FIGS. 7*a*, 7*b*.

Starting from the standby position according to FIGS. 7*a*, 7*b*, the opening slider 68*b* can be moved (in FIGS. 7*a*, 7*b* to the right) along its sliding direction (indicated by a double arrow 72*b*) into an opening position by activating the drive unit 34*b*. Assuming that the door latch 22*b* is initially in its closed state (i.e. the rotary gripper 26*b* is in its gripping position, cf. FIG. 7*b*), the opening element 32*b* then pushes against the contact portion 58*b* of the actuation extension 56*b* and thereby forces a rotation of the rotary gripper 26*b* towards the release position. This action is illustrated in FIG. 7*c*. The door latch 22*b* is thus opened without the user having to pull on a domestic appliance door, e.g., the door 20 of the washing machine 10 of FIG. 1.

In the embodiment of FIGS. 6 to 7*c*, the opening slider 68*b* is designed solely for automatically opening the door latch 22*b*; it has no locking function. The latter function is performed by the locking mechanism 66*b*. This comprises an actuator separate from the electric motor 36*b*, for example in the form of an electromagnet, and a locking member movable back and forth by means of this actuator and structurally independent of the opening slider 68*b*. However, details of the locking mechanism 66*b* are not of further importance at this point, and therefore a more detailed description of said actuator and of the locking member of the locking mechanism 66*b* is omitted here.

In the embodiment of FIGS. 8 to 10*b*, the door latch 22*c* comprises a locking slider 74*c* and a spring adjustment slider 76*c*, both of which are disposed in the latch housing 24*c* so as to be linearly displaceable in a direction perpendicular to the axis of rotation 42*c* of the rotary gripper 26*c* and parallel to each other, but independent of each other. The direction of movement of the two sliders 74*c*, 76*c* is indicated by a double arrow 78*c*. The drive unit 34*c* comprises a rotary control body 80*c*, which is shown enlarged and in perspective once again in FIG. 9. The output pinion 54*c* of the reduction gear 38*c* is in meshing engagement with a circumferential toothing of the rotary control body 80*c* and drives the rotary control body 80*c* for rotation. In the example case shown, the rotary control body 80*c* is disk-like in design and can therefore also be referred to as a control disk or cam disk. By appropriate contouring, a pair of axially (with respect to an axis of rotation of the rotary control body 80*c*) offset control tracks (cam tracks) 82*c*, 84*c* are formed on the radial outer circumference of the rotary control body 80*c* and serve to control the position of the pair of sliders 74*c*, 76*c*. In the example shown, the control track 82*c* is provided for controlling the position of the locking slider 74*c*, while the control track 84*c* is provided for controlling the position of the spring adjustment slider 76*c*.

The locking slider 74*c* is biased into contact with the control track 82*c* of the rotary control body 80*c* by a biasing spring 86*c*, which in the example shown is in the form of a helical compression spring and is supported between the locking slider 74*c* and the latch housing 24*c*, and thereby follows the radial path of the control track 82*c* (i.e. path follower). The control track 82*c* forms a pronounced radial cam 88*c* (radial again with respect to the axis of rotation of the rotary control body 80*c*), which defines an unlocking position of the locking slider 74*c*.

Figure 8:
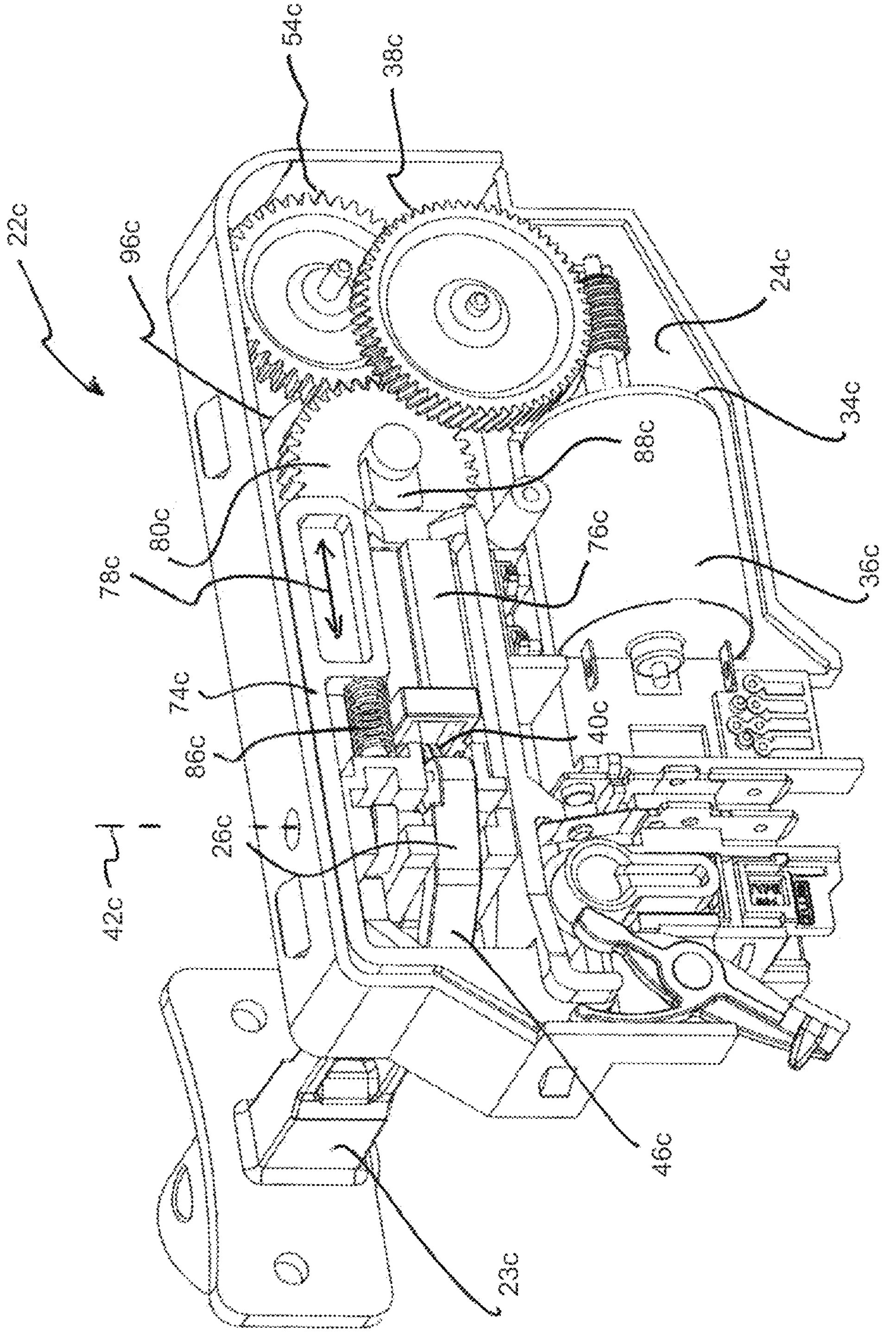
FIG. 8 a perspective view of a door latch according to a further embodiment in a neutral state, in which manual closing and opening of the door latch is possible.
Figure 10A:
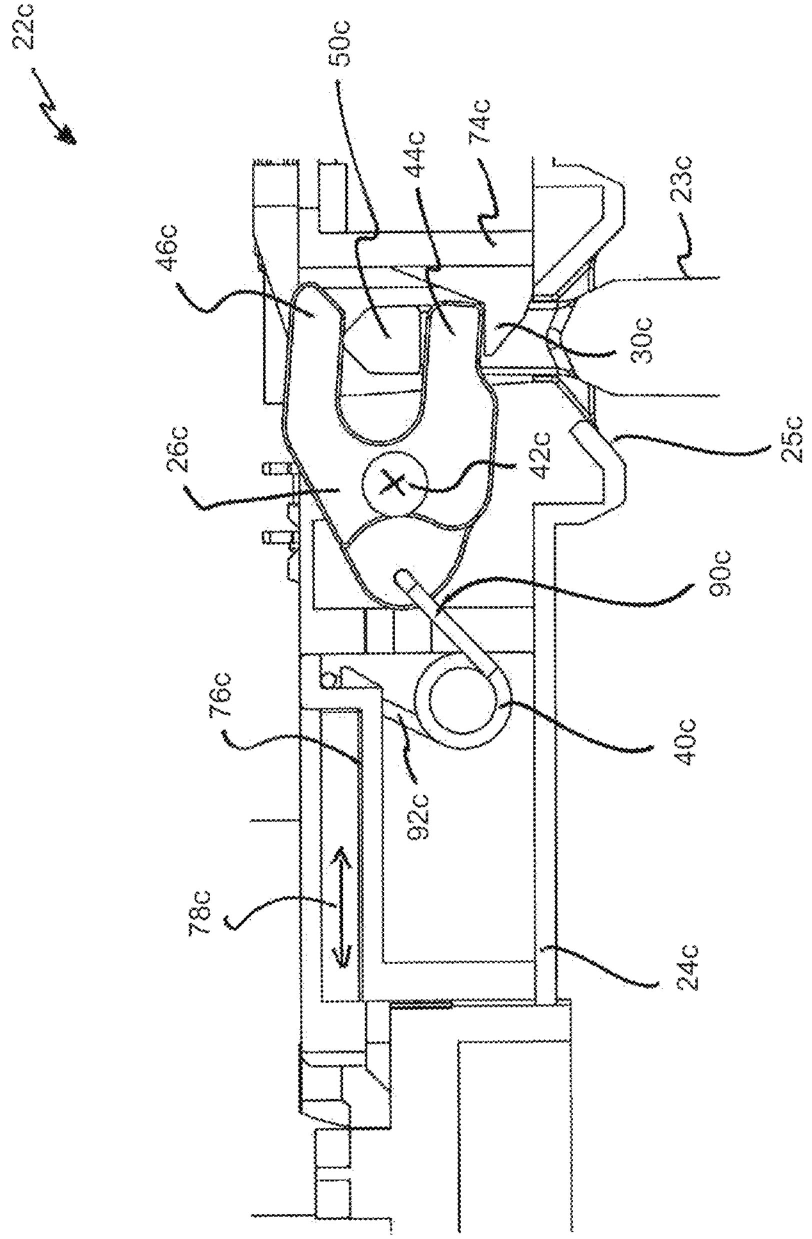
FIG. 10*a* a sectional view of a portion of the door latch of FIG. 8 including the spring adjustment slider and a rotary gripper in a closed and locked state of the door latch with a normal biasing effect of a biasing spring of the rotary gripper.
Figure 10B:
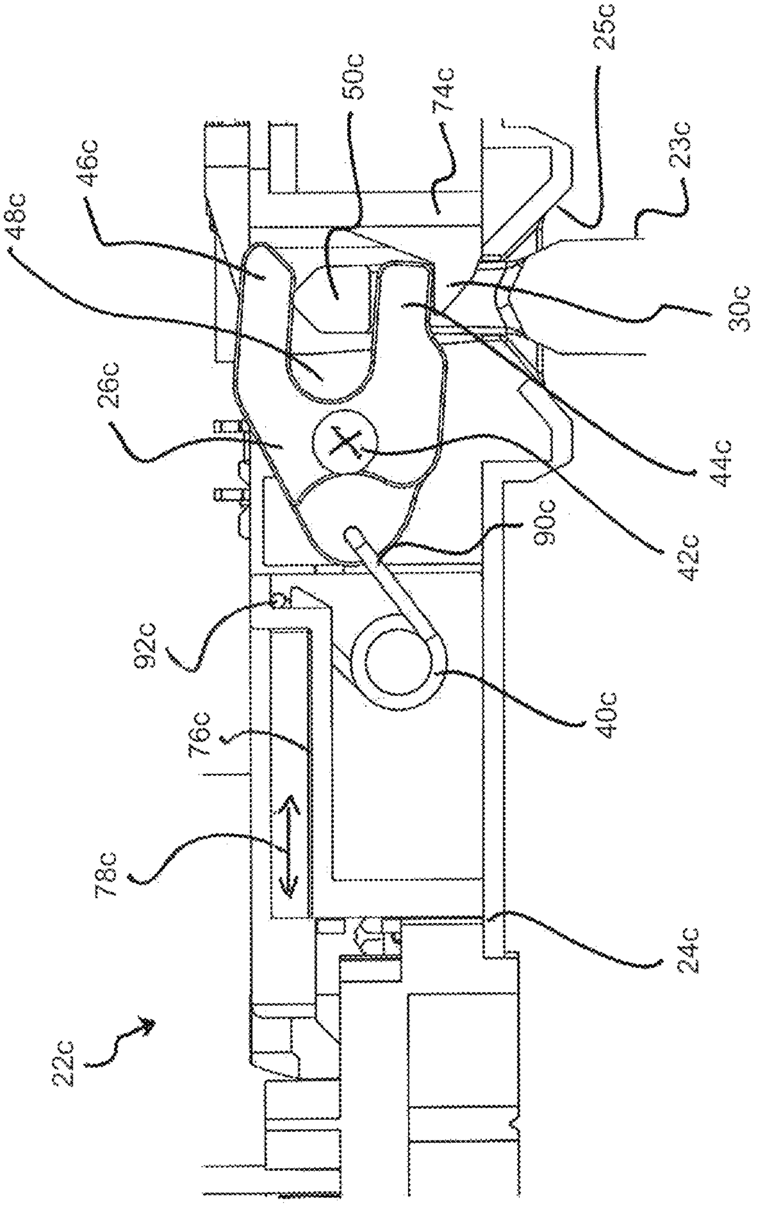
FIG. 10*b* a section corresponding to FIG. 10*a*, but with an increased biasing effect of the biasing spring of the rotary gripper.

In the neutral state of the door latch 22 shown in FIG. 8, the rotary control body 80*c* is rotated to such a rotational position that the locking slider 74*c* abuts the cam tip of the radial cam 88*c*; in this situation, the locking slider 74*c* is ineffective relative to the rotary gripper 26*c* and does not interfere with the free rotation of the rotary gripper 26*c* between the gripping position (as shown in FIGS. 8, 10*a* and 10*b*) and the release position.

By rotating the rotary control body 80*c* away from the rotational position shown in FIG. 8 with the door latch 22*c* closed, and thereby simultaneously rotating the radial cam 88*c* away from the locking slider 74*c*, the locking slider 74*c* can move to a locking position shown in FIGS. 10*a* and 10*b* under the action of the biasing spring 86*c* relaxing in the process. In the locking position, a locking element 30*c* formed on the locking slider 74*c* projects into the rotational movement path of the rotary gripper 26*c*, thereby blocking the rotary gripper 26*c* from rotating from the gripping position to the release position. In the example case shown, the locking element 30*c* is formed by a nose-like or hook-like locking projection which is moved under the jaw 44*c* of the rotary gripper 26*c* in the locking position of the locking slider 74*c*. It is understood that other configurations of the locking element 30*c* and other locations of the locking action of the locking element 30*c* on the rotary gripper 26*c* are conceivable.

In the embodiment of FIGS. 8 to 10*b*, the torsion spring 40*c* is supported by one of its spring legs (designated 90*c* in FIGS. 10*a* and 10*b*) on the rotary gripper 26*c* and by its other spring leg (designated 92*c*) on the spring adjustment slider 76*c*. The spring adjustment slider 76*c* serves as an adjustment element to vary the biasing force of the torsion spring 40*c*. Due to the mobility of the spring adjustment slider 76*c*, the support point at which the torsion spring 40*c* is supported on the spring adjustment slider 76*c* has translational (specifically: linear) mobility relative to the axis of rotation 42*c* of the rotary gripper 26*c*. This mobility can be used to increase the biasing force of the torsion spring 40*c* acting on the rotary gripper 26*c* and holding it in the gripping position when the door latch 22*c* is closed and locked. FIG. 10*a* shows the spring adjustment slider 76*c* in a normal position, in which the biasing force exerted on the rotary gripper 26*c* by the torsion spring 40*c* is not increased in the closed state of the door latch 22*c*. FIG. 10*b* shows the spring adjustment slider 76*c* in an activation position, in which the spring adjustment slider 76*c* is shifted along the sliding direction 78*c* closer to the rotary gripper 26*c*, compared to its normal position. In the activation position, the angle between the spring legs 90*c*, 92*c* is smaller than in the normal position, i.e. the spring-effective geometry of the torsion spring 40*c* is different in the activation position than in the normal position. Because of the smaller angle between the spring legs 90*c*, 92*c*, the force exerted by torsion spring 40*c* on the rotary gripper 26*c* is greater in the activation position than in the normal position.

Figure 9:
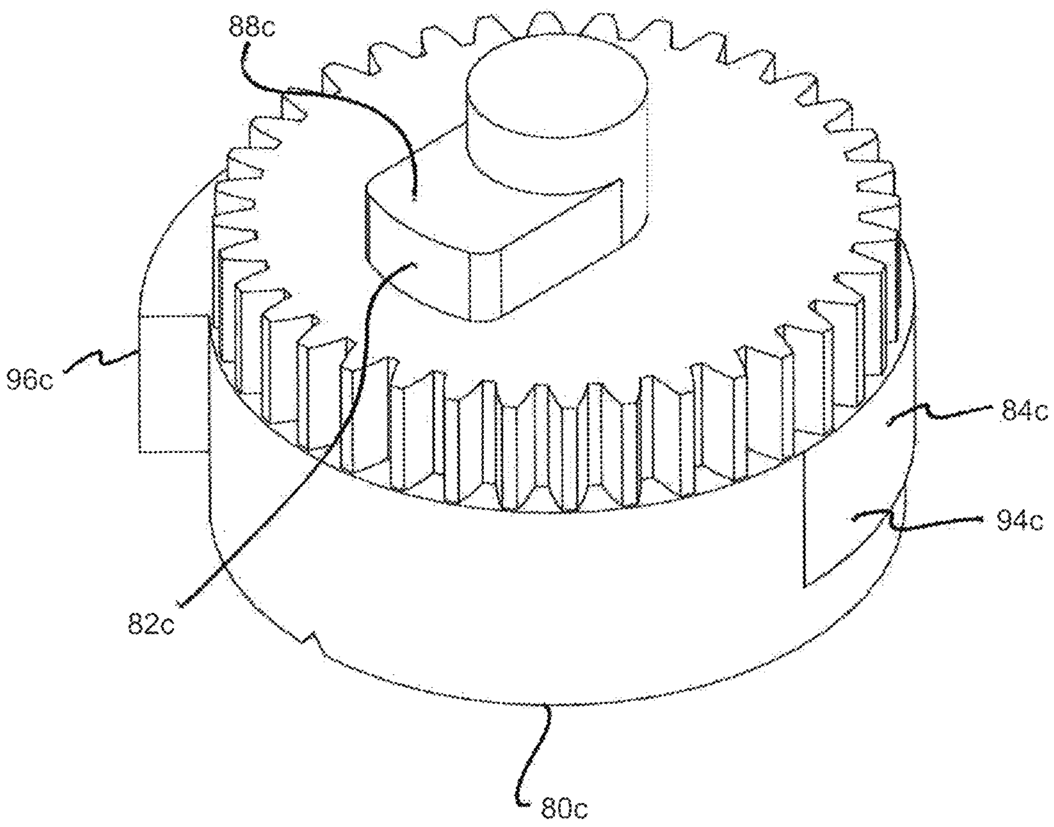
FIG. 9 in perspective a rotary control body for a locking slider and a spring adjustment slider of the door latch of FIG. 8.

The spring adjustment slider 76*c* is forced into contact with the control track 84*c* by the force of the torsion spring 40*c* and thus follows its radial course. The control track 84*c* has a track section 94*c* of lesser radial height that continuously transitions to a track section 96*c* of greater radial height (FIG. 9). The track section 94*c* corresponds to the normal position of the spring adjustment slider 76*c*, the track section 96*c* corresponds to the activation position of the spring adjustment slider 76*c*. It can be seen in FIG. 9 that both track sections 94*c*, 96*c* lie within a circumferential angular range of the rotary control body 80*c*, in which the control track 82*c* has a constant radial height corresponding to the locking position of the locking slider 74*c*. This means that the spring adjustment slider 76*c* can be selectively adjusted to the normal position or the activation position through rotation of the rotary control body 80*c* while the locking slider 74*c* is in its locking position. In the example shown, the circumferential angle range of the control track 82*c*, which corresponds to the locking position of the locking slider 74*c*, extends over more than 180 degrees.

Reference is now made to the embodiment of FIGS. 11*a* to 13. In this embodiment, the door latch 22*d* comprises a locking slider 74*d* with a function for locking the rotary gripper 26*d* and an opening slider 68*d* with a function for automatically opening the rotary gripper 26*d* (i.e. for forced rotation of the rotary gripper 26*d* from the gripping position to the release position for the purpose of opening the door). In contrast to the embodiment of FIGS. 2 to 4, where a common functional body, in the form of the multi-functional slider 28, is provided as a carrier of (at least) a locking element and an opening element, the locking slider 74*d* and the opening slider 68*d* are separate components arranged to be movable independently of each other. However, both components are position controllable by a common rotary control body 80*d*, similar to what the rotary control body 80*c* accomplishes for the two sliders 74*c*, 76*c* in the embodiment of FIGS. 8 to 10*b*. The rotary control body 80*d* may be driven by means of a drive unit not shown in detail in FIGS. 11*a* to 11*c*, which may comprise an electric motor as a driving force source. Thus, a common driving force source is available for both sliders 74*d*, 68*d*. This drive unit may, but need not, comprise a reduction gear in the power transmission path between the electric motor and the rotary control body 80*d*. The locking slider 74*d* and the opening slider 68*d* are disposed in the latch housing 24*d* for linear displacement in a direction perpendicular to the axis of rotation 42*d* of the rotary gripper 26*d* and parallel to each other. The double arrow 78*d* indicates the direction of movement of the two sliders 74*d*, 68*d*.

Figure 11A:
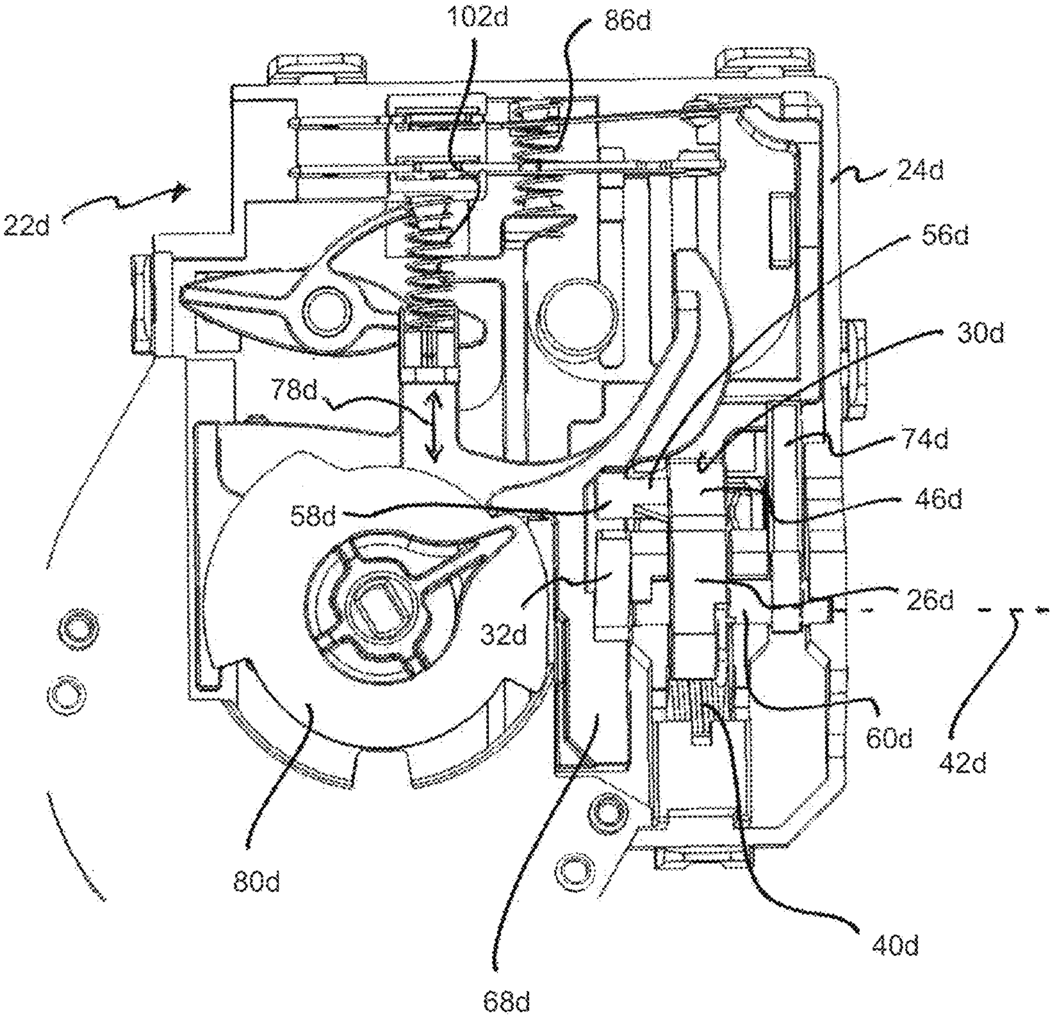
FIG. 11*a* a view of a door latch according to a further embodiment in a neutral state, in which manual closing and opening of the door latch is possible.
Figure 11B:
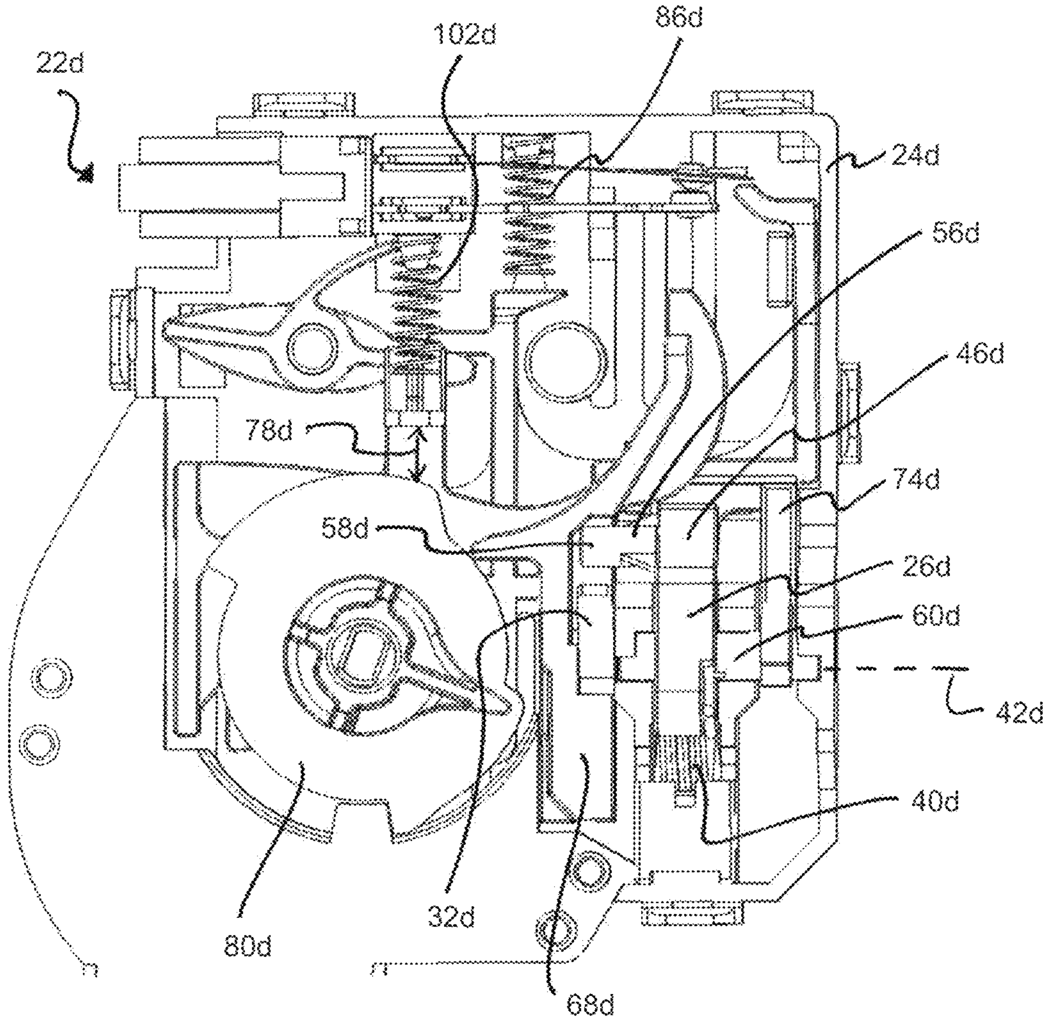
FIG. 11*b* the door latch of FIG. 11*a* in the same view, but in a closed and locked state.

In FIG. 11*a*, the door latch 22*d* is in a neutral state in which both sliders 74*d*, 68*d* are inoperative with respect to the rotary gripper 26*d*. In this neutral state, the locking slider 74*d* is in an unlocking position, the opening slider 68*d* is in a deactivation position; the rotary gripper 26*d* is free to rotate between the gripping position and the release position for manual closing and opening of the door. In FIG. 11*b*, the locking slider 74*d* is moved to a locking position in which it blocks the rotary gripper 26*d* from rotating from the gripping position to the release position when the door is closed. The opening slider 68*d* is still in its deactivation position. Finally, in FIG. 11*c*, the locking slider 74*d* is moved back to its unlocking position, while the opening slider 68*d* is moved to an opening position (active position). When moving into the open position, the opening slider 68*d* pushes against the actuation extension 56*d* and forces the rotary gripper 26*d* out of the gripping position into the release position, thus opening the door latch 22*d*.

Similar to the rotary control body 80*c*, the rotary control body 80*d* also has two axially (referring to an axis of rotation of the rotary control body 80*d*) offset control tracks 82*d*, 98*d*— one (here the control track 82*d*) for position control of the locking slider 74*d*, the other (here the control track 98*d*) for position control of the opening slider 68*d*. The locking slider 74*d* is biased by the biasing spring 86*d* into contact with the control track 82*d* of the rotary control body 80*d*. A radial cam 88*d* of the control track 82*d* defines the unlocking position of the locking slider 74*d*. In the neutral state of the door latch 22 shown in FIG. 11*a*, the rotary control body 80*d* is rotated to a rotational position such that the locking slider 74*d* engages the radial cam 88*d*. By rotating the rotary control body 80*d*, the radial cam 88*d* can be rotated away from the locking slider 74*d*. The locking slider 74*d* can then move to the locking position as shown in FIG. 11*b* under the action of the biasing spring 86*d*, which relaxes in the process.

Figure 11C:
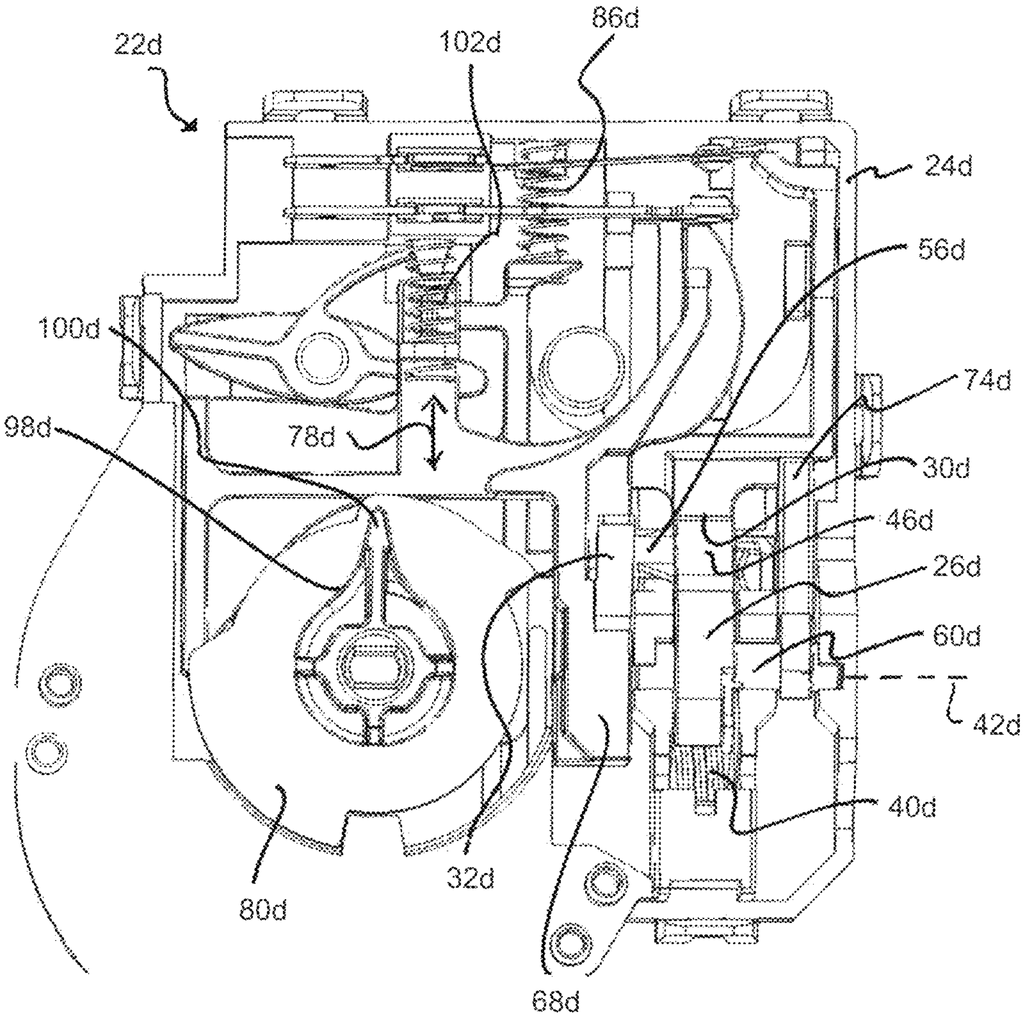
FIG. 11*c* the door latch of FIG. 11*a* in the same view, but in a state after automatic opening.

Within the circumferential angular extension of the radial cam 88*d*, the control track 98*d* forms a radial cam 100*d*, which defines the opening position of the opening slider 68*d*. The opening slider 68*d* is biased by a biasing spring 102*d*— in the example shown, again in the form of a helical compression spring—into contact with the control track 98*d* of the rotary control body 80*d*. While the locking slider 74*d* is in the unlocking position, the tip of the radial cam 100*d* can be rotated in front of the opening slider 68*d* through rotation of the rotary control body 80*d* (FIG. 11*c*). This moves the opening slider 68*d* to its opening position (against the force of the biasing spring 102*d*).

Figure 12:
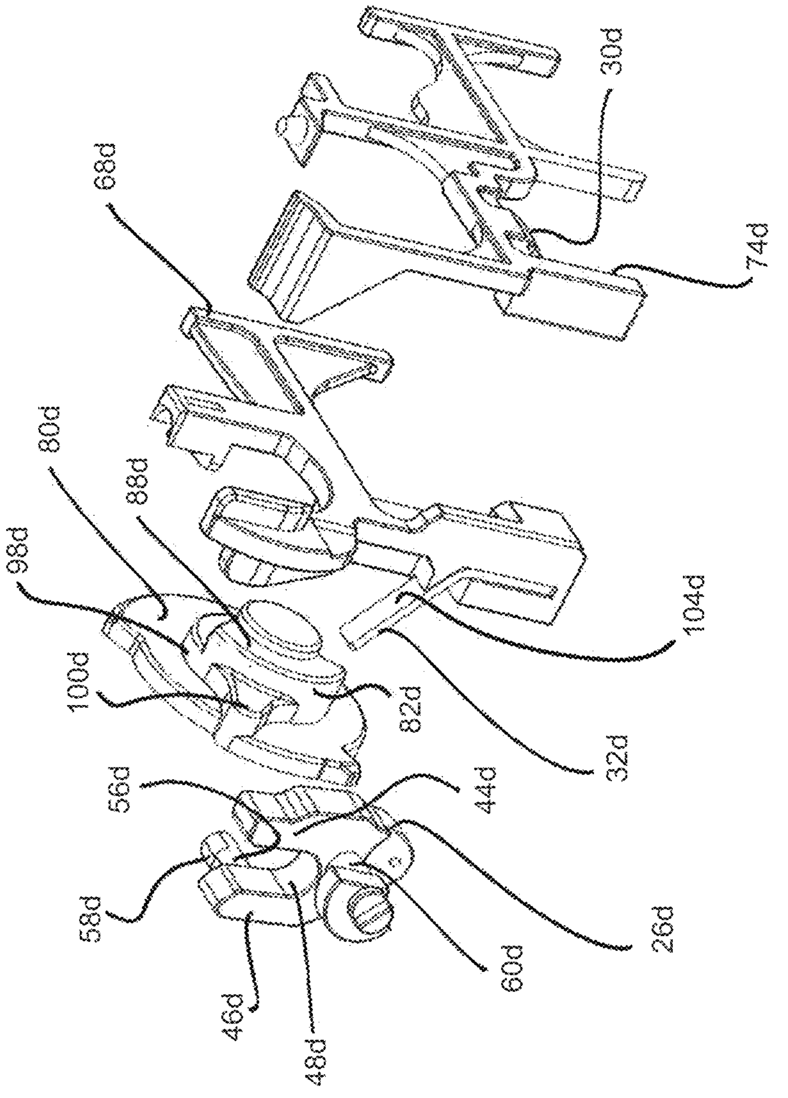
FIG. 12 is an exploded view of components of the door latch of FIGS. 11*a* to 11*c*.
Figure 13:
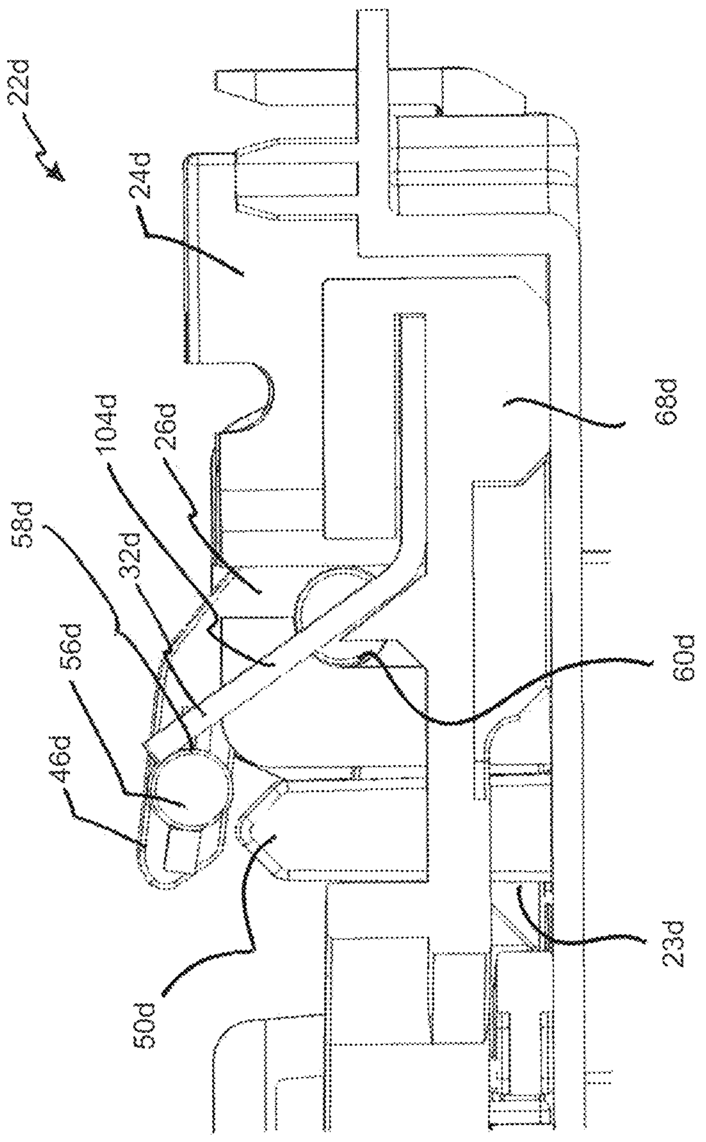
FIG. 13 a sectional view of a portion of the door latch of FIGS. 11*a* to 11*c* including a rotary gripper and an opening element when the door latch is in the closed state.

FIGS. 12 and 13 show that a leaf spring element 104*d*, e.g. formed by an angled piece of sheet metal, is clamped in the opening slider 68*d*, wherein a free end portion of the leaf spring element 104*d* forms the opening element 32*d*. The leaf spring element 104*d* is a possible implementation of a resilient force transmission body arranged in the force transmission path between the rotary control body 80*d* and the rotary gripper 26*d*. The flexible deflectability of the free end portion of the leaf spring element 104*d* helps to prevent damage to the rotary gripper 26*d* and the door latch 22*d* as a whole. At the same time, the leaf spring element 104*d* is sufficiently rigid to transmit to the actuation extension 56*d* of the rotary gripper 26*d* the forces necessary to force open the door latch 22*d*. In the embodiment of FIGS. 11*a* to 13, the actuating extension 56*d* is designed as a pin projecting axially from the jaw 46*d*. This does not change the fact that the contact portion 58*d* is radially spaced from the axis of rotation 42*d* of the rotary gripper 26*d* and accordingly permits the introduction of a torque by the opening slider 68*d* or its opening element 32*d*. As an alternative to the construction shown in FIG. 13, it is conceivable, for example, to mount a (rigid) lever body on the opening slider 68*d* in an articulated manner and to preload this lever body elastically by means of a spring element (e.g., leaf spring). In such an alternative embodiment, the lever body may form the opening element 32*d* and may physically cooperate with the actuation extension 56*d*; the spring element ensures the elastic deflectability of the lever body.

What is claimed is:

1. A door latch for a domestic electrical appliance, the door latch comprising:

a latching element arranged for movement between a closing position and a release position, said latching element being capable of capturing a closing body for holding a door of said domestic electrical appliance closed in said closing position and allowing release of said closing body for opening said door in said release position;

a plurality of movably arranged functional elements for respectively different mechanical functions with respect to the latching element, wherein a first of the functional elements forms a first locking element movably arranged between a locking position and an unlocking position, which in the locking position is capable of effecting a blocking of the latching element against movement from the closing position to the release position and in the unlocking position permits a movement of the latching element from the closing position to the release position; and an electromotive drive unit for driving the functional elements from a common driving force source;

wherein the latching element is formed by a rotary gripper arranged for rotation relative to a latch housing of the door latch between the closing position and the release position and having a gripping mouth delimited between a pair of jaws, the rotary gripper being adapted to hold captive the closing body in the gripping mouth in the closing position and to permit escape of the closing body from the gripping mouth in the release position;

wherein the door latch further comprises a spring configured to act in a bistable manner such that the spring:

exerts a bias on the rotary gripper in the closing position which counteracts a rotary movement of the rotary gripper towards the release position; and exerts a bias on the rotary gripper in the release position which counteracts a rotary movement of the rotary gripper towards the closing position;

wherein the rotary gripper, the spring, a multi-functional slider with the first locking element and a second locking element and an opening element, and the electromotive drive unit are accommodated in the latch housing, and wherein the multi-functional slider is designed as a linear slider, which is displaceable relative to the rotary gripper along a linear direction orthogonal to an axis of rotation of the rotary gripper;

wherein the rotary gripper comprises an actuation extension essentially formed as an arm which projects in an approximately radial direction from a support pin of the rotary gripper centered on the axis of rotation of the rotary gripper; and wherein in a locking position the first and second locking elements of the multi-functional slider are moved into a rotary movement path of the rotary gripper in such a way that a reverse rotation of the rotary gripper from a gripping position into the release position is prevented, wherein each of the first and second locking elements of the multi-functional slider independently locks the rotary gripper against rotation from the gripping position to the release position, wherein the first locking element extends between the jaws of the rotary gripper into the gripping mouth when the door latch is closed and the multi-functional slider is in the locking position, and wherein the second locking element is moved in front of the actuation extension of the rotary gripper in the locking position of the multi-functional slider.

2. The door latch of claim 1, wherein the first functional element and at least one other of the functional elements are formed by a common component.

3. The door latch of claim 1, wherein another of the functional elements forms an opening element which, in the closing position of the latching element, is capable of exerting a force thereon which urges the latching element from the closing position towards the release position.

4. The door latch of claim 3, wherein the first and second locking elements and the opening element are formed by a common, movably arranged functional body, which is adjustable by the drive unit into three defined positions, of which:

a first position corresponds to an unlocking state of the first and second locking elements and a deactivation state of the opening element;

a second position corresponds to a locking state of the first and second locking elements and the deactivation state of the opening element; and a third position corresponds to the unlocking state of the first and second locking elements and an activation state of the opening element.

5. The door latch of claim 4, wherein the common functional body is arranged to be movable from the first position in a first direction of movement into the second position and in an opposite second direction of movement into the third position.

6. The door latch of claim 1, wherein the actuation extension of the rotary gripper defines a contact portion radially spaced from the axis of rotation of the rotary gripper for contacting the opening element of the multi-functional slider, wherein the opening element is arranged on the multi-functional slider in such a way that when the multi-functional slider is moved from a neutral position to an opening position with the door latch closed, the opening element hits against the contact portion of the actuation extension and thereby acts on the rotary gripper to introduce torque.

7. The door latch of claim 1, wherein the multi-functional slider is a one-piece component that includes the first and second locking elements and the opening element as integral components.

* * * * *